(12) United States Patent
Papetti et al.

(10) Patent No.: US 10,707,037 B2
(45) Date of Patent: Jul. 7, 2020

(54) FAST EARTHING SWITCH DEVICE FOR HV APPLICATIONS

(71) Applicant: ABB Power Grids Switzerland AG, Baden (CH)

(72) Inventors: Matteo Papetti, Cerro al Lambro (IT); Roberto Mingiardi, Milan (IT); Ennio Errico, Casirate d'Adda (IT); Neal-Zhipeng Yuan, Beijing (CN); Roberto Fabbi, Massalengo (IT)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/315,853

(22) PCT Filed: Jul. 6, 2016

(86) PCT No.: PCT/EP2016/065945
§ 371 (c)(1),
(2) Date: Jan. 7, 2019

(87) PCT Pub. No.: WO2018/006952
PCT Pub. Date: Jan. 11, 2018

(65) Prior Publication Data
US 2019/0139727 A1 May 9, 2019

(51) Int. Cl.
*H01H 3/30* (2006.01)
*H02B 5/01* (2006.01)
(Continued)

(52) U.S. Cl.
CPC ........ *H01H 31/003* (2013.01); *H01H 3/3005* (2013.01); *H01H 3/3015* (2013.01);
(Continued)

(58) Field of Classification Search
CPC .. H01H 3/3005; H01H 3/3026; H01H 3/3052; H01H 3/38; H01H 31/003;
(Continued)

(56) References Cited

U.S. PATENT DOCUMENTS 3,679,852 A * 7/1972 Himi ...................... H01H 3/30
200/400
5,508,487 A * 4/1996 Smith .................. H01H 3/3031
200/400

(Continued)

FOREIGN PATENT DOCUMENTS

CN 101369498 A 2/2009
CN 203192673 U 9/2013
(Continued)

OTHER PUBLICATIONS

Translation of KR 1020020023515 (Original doc. published Mar. 29, 2002) (Year: 2002).*
(Continued)

*Primary Examiner* — William A Bolton
(74) *Attorney, Agent, or Firm* — Sage Patent Group (57) ABSTRACT

A fast earthing switch device for HV applications which includes a gas-tight casing, a movable contact connectable to and unconnectable from a fixed contact. The movable contact is linearly movable between an open position and a closed position. The device further includes an operating mechanism for the movable contact and is characterized in that the operating mechanism includes an actuating spring actuating a closing operation of the movable contact from the open position to the closed position, at least a driving lever mounted on an operating shaft actuating an opening operation of the movable contact from the closed position to the open position, the driving lever also partially reloading the actuating spring during the opening operation, the oper- (Continued)

ating mechanism further includes coupling means operatively coupling the driving lever to the movable contact.

15 Claims, 11 Drawing Sheets

(51) Int. Cl.
*H01H 31/00* (2006.01)
*H01H 31/02* (2006.01)

(52) U.S. Cl.
CPC ........ *H01H 3/3052* (2013.01); *H01H 31/026* (2013.01); *H02B 5/01* (2013.01)

(58) Field of Classification Search
CPC ...... H01H 31/026; H01H 33/36; H01H 33/42; H01H 33/46; H01H 5/06; H01H 9/16; H02B 5/01
USPC ...... 200/48 R, 400; 218/154, 13, 14, 55, 56, 218/67, 68, 79, 80, 97
See application file for complete search history.

(56) References Cited

U.S. PATENT DOCUMENTS

| | | | | |
|---|---|---|---|---|
| 5,932,858 | A * | 8/1999 | Meinherz | H01H 33/53 218/154 |
| 6,013,886 | A | 1/2000 | Gimeno et al. | |
| 6,917,006 | B2 | 7/2005 | Bachofen | |
| 7,642,478 | B2 | 1/2010 | Courbon et al. | |
| 7,759,595 | B2 * | 7/2010 | Yoshitake | H01H 5/06 218/154 |
| 8,963,039 | B2 * | 2/2015 | Ohda | H01H 33/50 218/143 |
| 9,343,881 | B2 * | 5/2016 | Hyrenbach | H02B 13/045 |
| 2004/0179318 | A1 | 9/2004 | Hashimoto et al. | |
| 2009/0045170 | A1 | 2/2009 | Shimizu et al. | |
| 2010/0314358 | A1 * | 12/2010 | Zimmermann | H01T 1/02 218/154 |
| 2012/0199456 | A1 * | 8/2012 | Tak | H01H 3/3015 200/400 |
| 2012/0273464 | A1 * | 11/2012 | Yeon | H01H 33/40 218/154 |
| 2014/0346147 | A1 * | 11/2014 | Blanchet | H01H 33/40 218/154 |
| 2015/0136739 | A1 * | 5/2015 | Hashimoto | H01H 33/40 218/78 |

FOREIGN PATENT DOCUMENTS

| | | | | |
|---|---|---|---|---|
| EP | 0895260 | A1 | 2/1999 | |
| FR | 2778492 | A1 | 11/1999 | |
| FR | 2865572 | A1 | 7/2005 | |
| JP | H01214205 | A | 8/1989 | |
| JP | H06119852 | A | 4/1994 | |
| JP | 2013138528 | A | 7/2013 | |
| KR | 1020020023515 | * | 3/2002 | ............ H01H 31/00 |
| WO | 9527295 | A1 | 10/1995 | |
| WO | 03071564 | A1 | 8/2003 | |

OTHER PUBLICATIONS

European Patent Office, International Search Report & Written Opinion issued in corresponding Application No. PCT/EP2016/065945, dated Oct. 28, 2016, 12 pp.

Chinese Patent Office, Office Action issued in corresponding Application No. 201680087416.9, dated Oct. 8, 2019, 7 pp.

* cited by examiner

FAST EARTHING SWITCH DEVICE FOR HV APPLICATIONS

The present invention relates to an earthing device, in particular to an earthing device for fast earthing operations in the high voltage (HV) field having improved features in terms of both architecture and performances. For the purposes of the present invention, the term high voltage (HV) is referred to applications above 1 kV.

The use of earthing devices is well known in HV applications, as HV substations (AIS, GIS or hybrid) can be commonly equipped with one or more earthing devices.

In particular cases it may be necessary to provide the installation with fast-acting earthing switches in order to, e.g., protect personnel, address capacitively induced voltage, dissipate any retained charge, etc., and they can close against full voltage and short-circuit power.

In order to ensure the fast closing operation, the energy needed for such fast operation is normally stored in one or more operating springs. When the grounding device is housed in a gas-tight compartment, the actuating spring or springs are normally positioned outside the compartment in order to minimize its volume. However, such a solution requires a mechanical linking from the outside to the inside of the compartment as well as mechanical seals able to withstand the relatively high forces and speeds which are transmitted from the actuating spring (outside the compartment) to the contact of the earthing device (inside the compartment).

Alternative solutions in which the spring(s) is(are) located inside the compartment are known, but they normally require complicated mechanical linking systems between the spring(s) and the contact.

Hence, the present disclosure is aimed at providing a fast earthing switch device for HV applications, which allows overcoming at least some of the above mentioned shortcomings.

Thus, in a first aspect, the present invention relates to a fast earthing switch device for HV applications comprising a gas-tight casing, a movable contact connectable to and unconnectable from a fixed contact, said movable contact being linearly movable between an open position in which it is spaced apart from said fixed contact and a closed position in which it is connected to said fixed contact and vice-versa, and further comprising an operating mechanism for said movable contact. The device according to the present invention is characterized in that said operating mechanism comprises an actuating spring for actuating the closing operation of said movable contact from said open position to said closed position and at least a driving lever mounted on an operating shaft actuating an opening operation of said movable contact from said closed position to said open position. Furthermore, the device according to the present invention is characterized in that said driving lever also partially reloads said actuating spring during said opening operation, and in that said operating mechanism further comprises coupling means operatively coupling said driving lever to said movable contact.

In practice, as better explained in the following description, in the fast earthing switch device of the present invention, the actuating spring is located inside the gas-tight compartment thereby avoiding the need of having high performance mechanical seals between the outside and the inside of the compartment.

Moreover, the connection between the actuating spring and the movable contact is very simple and does not require complicated mechanical linking system connecting the spring to the contact.

Indeed, as better described in the following description, preferably said actuating spring is a compression spring which is coaxially mounted on said movable contact.

In such a case, the operating shaft is substantially perpendicular to the direction of movement of said movable contact during said opening/closing operation and the driving lever rotates in a plane which is perpendicular to said operating shaft during said opening/closing operation.

In a preferred embodiment of the fast earthing switch device of the present invention, in said open position said driving lever is engaged with said coupling means and retains the movable contact in said open position and retains also said actuating spring in a partially loaded condition.

The sequence of operation of the fast earthing switch device of the present invention is conveniently such that said closing operation comprises a first phase in which said driving lever is engaged with said coupling means and moves said movable contact so that it is further spaced apart from said fixed contact while said actuating spring is further loaded, and a second phase in which said driving lever disengages from said coupling means and the movable contact is free to fast move under the action of said actuating spring into said closed position.

Also, in the opening operation of the fast earthing switch device of the present invention, said driving lever conveniently engages said coupling means and move the movable contact from said closed position into the open position, partially loading at the same time said actuating spring.

As better described in the detailed description, preferably during the opening and closing operation of the fast earthing switch device according to the present invention, said driving lever rotates always in the same direction.

In such a case, said operating mechanism preferably comprises locking means allowing rotation of said driving lever in one direction and preventing rotation of said driving lever in the opposite direction.

In a possible embodiment of the fast earthing switch device of the present invention, said coupling means comprise a fork operatively coupled to said movable contact and operatively couplable to and uncouplable from said driving lever.

In a further possible embodiment of the fast earthing switch device of the present invention, said operating mechanism comprises a first and a second lever which are positioned on opposite sides of said movable contact.

In still a further possible embodiment of the fast earthing switch device of the present invention, it can conveniently comprise signaling means for signaling the open/closed condition of said device.

A HV pole comprising a fast earthing switch device as described in the present disclosure is also part of the present invention.

Moreover, a HV substation, comprising a HV pole in turn comprising a fast earthing switch device as described in the present disclosure is also part of the present invention In particular, in case of a three-pole HV substation, comprising for each pole a fast earthing switch device as described in the present disclosure, said devices can be three-pole operated (i.e. comprising a single motor and mechanical connections for actuating all fast earthing switch devices), or single-pole operated (i.e. comprising for each pole a motor for actuating the fast earthing switch device of the corresponding pole.

Further features and advantages of the present invention will be more clear from the description of preferred but not exclusive embodiments of a fast earthing switch device according to the invention, shown by way of examples in the accompanying drawings, wherein.

With reference to the attached figures, in its general definition, a fast earthing switch device according to the present invention, designated with the reference numeral 1, comprises a gas-tight casing 2, into which a movable contact 3 is housed.

The movable contact 3 is connectable to and unconnectable from a fixed contact 4 in order to carry out an earthing operation and is linearly movable between an open position in which it is spaced apart from said fixed contact 4 and a closed position in which it is connected to said fixed contact 4, and vice-versa.

The fast earthing switch device 1 further comprising an operating mechanism 5 for said movable contact 3, said operating mechanism being designed to move the movable contact between the open position and the closed position.

One of the characterized features of the fast earthing switch device 1 of the present invention is given by the fact that said operating mechanism 5 comprises an actuating spring 51 which actuates a closing operation of said movable contact 3 from the open position to the closed position.

The operating mechanism 5 further comprises at least a driving lever 52 which is mounted on an operating shaft 53. The driving lever 52 has a two-fold purpose: a first task is the actuation of an opening operation of the movable contact 3 from said closed position to said open position, and a second task is a partial reload of said actuating spring 51 during said opening operation. In practice, as better shown hereinafter, the driving lever 52 (which is normally driven—directly or indirectly—by a motor) carries out the opening operation of the movable contact 3 and the partial reloading of the spring 51 at the same time.

Moreover, the operating mechanism 5 further comprises coupling means 6 which are aimed at operatively coupling said driving lever 52 to said movable contact 3.

In a largely preferred embodiment of the fast earthing switch device 1 according to the present invention said actuating spring 51 is a compression spring which is coaxially mounted on said movable contact 3 thereby avoiding any complicated mechanical linking between the spring and the movable contact.

In the embodiment shown in the attached figure, said operating shaft 53 is substantially perpendicular to the direction of movement of said movable contact 3 during said opening/closing operations and said driving lever 52—during said opening/closing operation—rotates in a plane which is perpendicular to said operating shaft 53.

Figure 3:
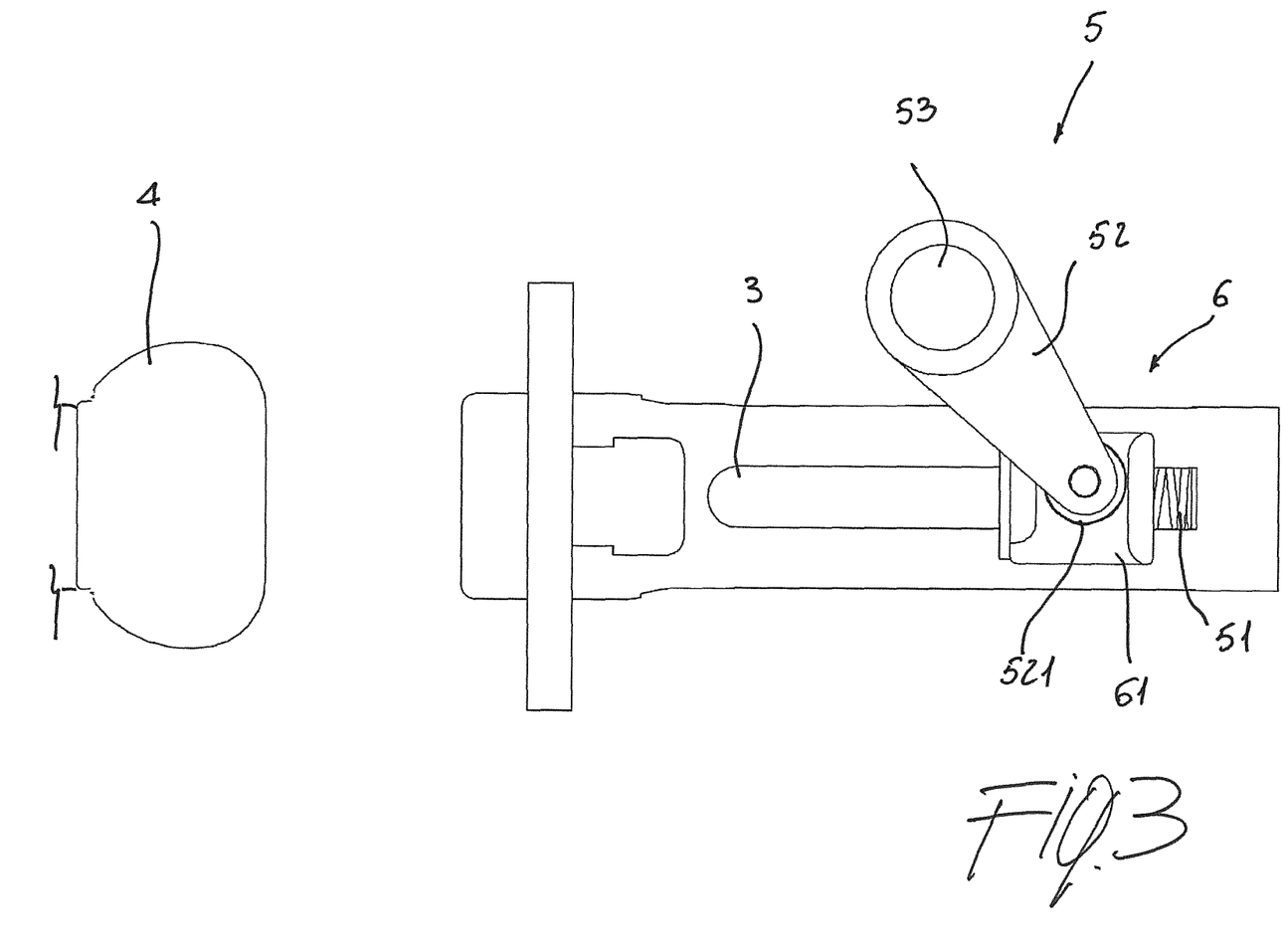
FIG. 3 is a view of a first detail of a fast earthing switch device according to the invention in the open position.

With reference to FIG. 3, when the fast earthing switch device 1 according to the present invention is in the open position, the driving lever 52 is engaged with said coupling means 6 and retains said movable contact 3 in said open position, as better described hereinafter. In this position the actuating spring 51 is in a partially loaded condition. For the purposes of the present invention, the term "partially loaded condition" means that the spring 51 can be further compressed (i.e. by moving the movable contact on the right-hand side of FIG. 3).

Figure 4:
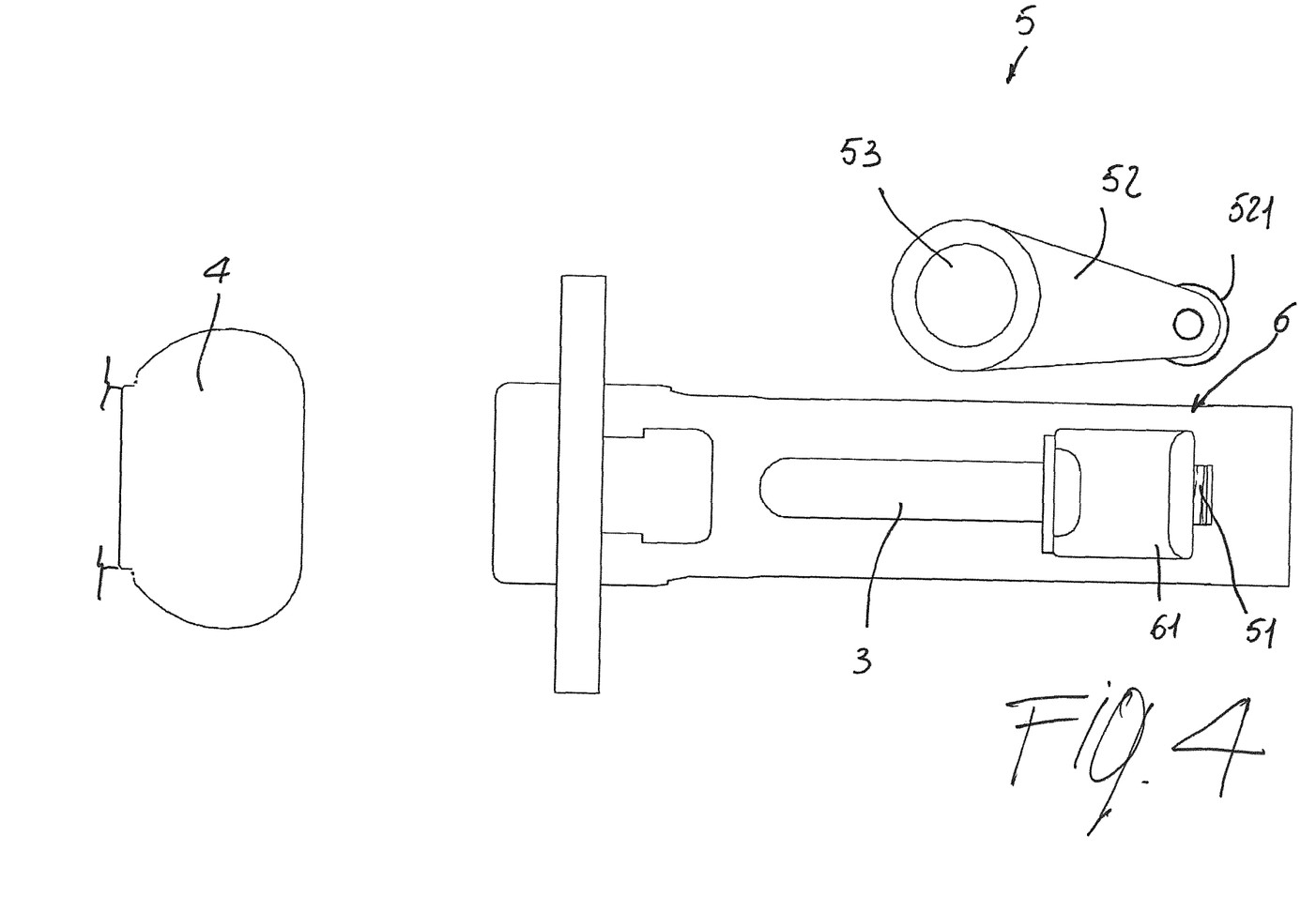
FIG. 4 is a view of a detail of a fast earthing switch device according to the invention in a first intermediate position between the open position and the closed position, in which the coupling means are disengaged by the lever and fast closing is released.

Now, with reference to FIGS. 3 and 4, the closing operation of the fast earthing switch device 1 according to the present invention comprises a first phase in which said driving lever 52 is engaged with said coupling means 6 (as in FIG. 3), moves said movable contact 3 (to the right-hand side of FIG. 3) so that it is further spaced apart from said fixed contact 4 while said actuating spring 51 is further loaded (intermediate situation between FIG. 3 and FIG. 4).

Figure 5:
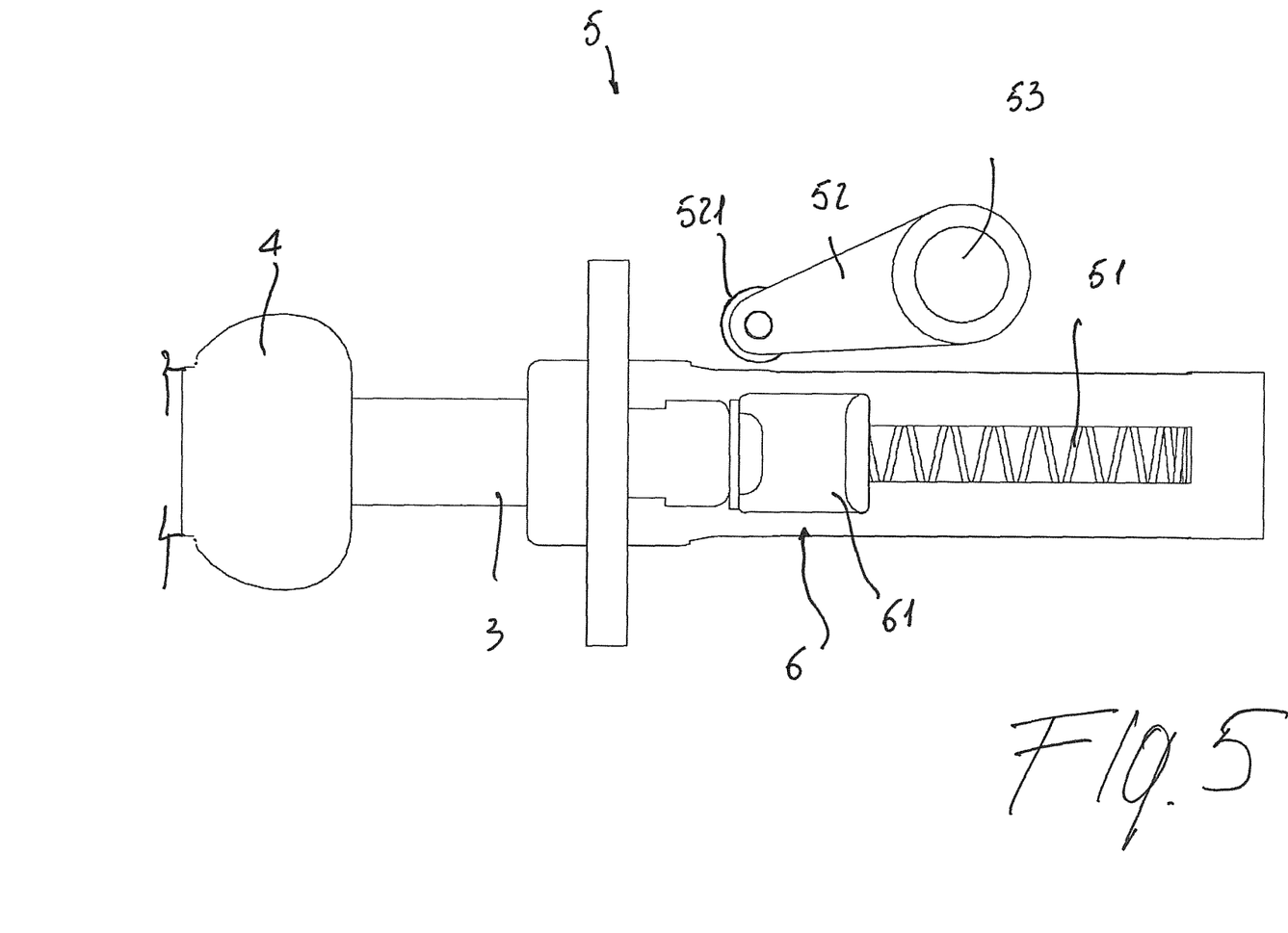
FIG. 5 is a view of a first detail of a fast earthing switch device according to the invention in the closed position.

Then—with reference to FIG. 4—the closing operation comprises a second phase in which said driving lever 52 disengages from said coupling means 6 and the movable contact 3 is free to fast move under the action of the actuating spring 51 into the closed position which is shown in FIG. 5.

Figure 1:
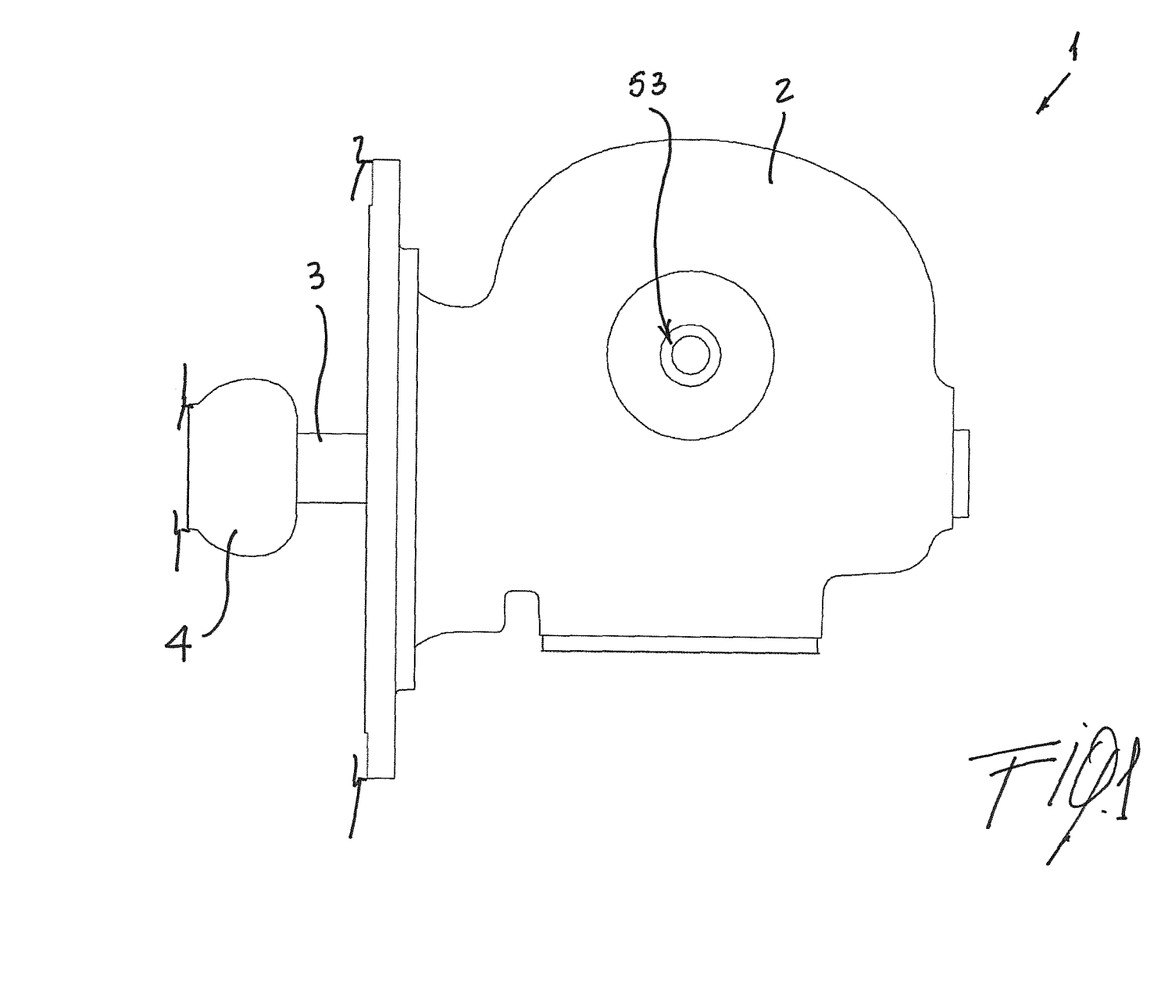
FIG. 1 is a first view of a fast earthing switch device according to the invention.
Figure 2:
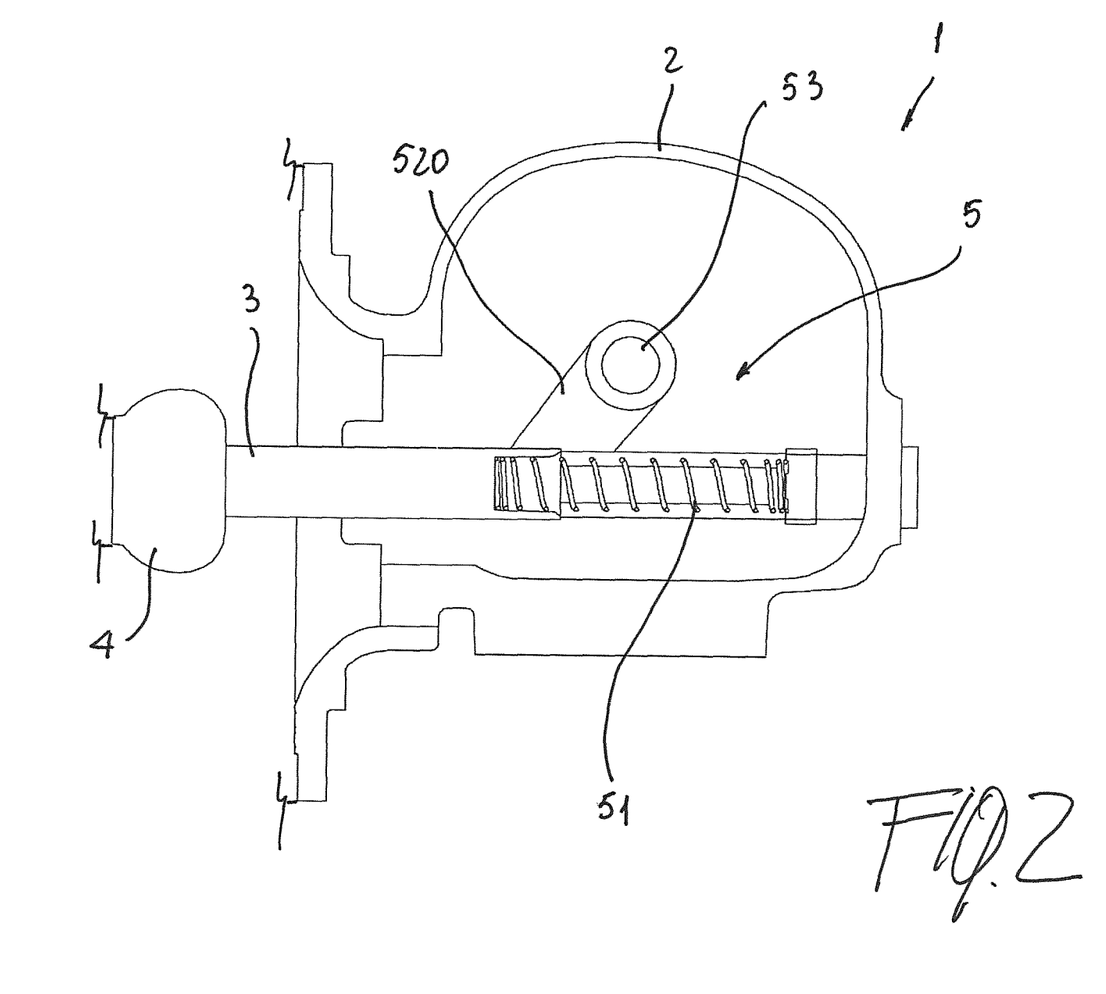
FIG. 2 is second view of a fast earthing switch device according to the invention.
Figure 6:
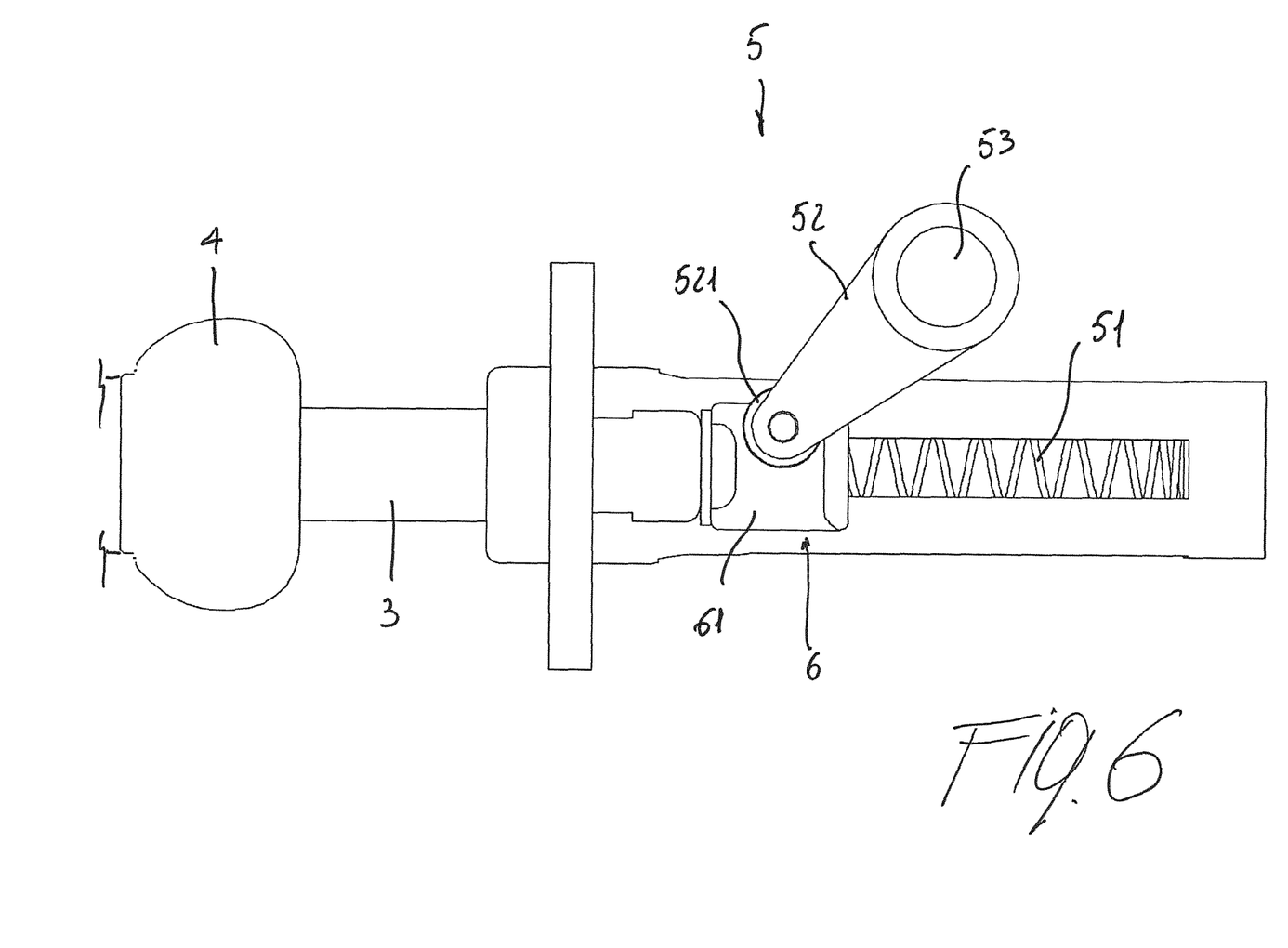
FIG. 6 is a view of a first detail of a fast earthing switch device according to the invention in the closed position, at the beginning of the opening operation.

From the closing position of FIG. 5, in the opening operation of the fast earthing switch device of the present invention, said driving lever 52 engages again the coupling means 6—as shown in FIG. 6—and starts moving the movable contact 3 from the closed position (of FIG. 5) into the open position (of FIG. 1), partially loading at the same time the actuating spring 51. Generally the partial loading of the spring 51 is in the range of 60-95% of the complete loading, preferably 70-90%, more preferably 75-85% of the complete loading of said spring 51.

Preferably, as shown in the attached figures, during said opening and closing operation of the fast earthing switch device 1 according to the invention, the driving lever 52 rotates always in the same operating direction, which, in the attached figures is counterclockwise.

In practice the operation of the driving lever 52 can be easily achieved by using an operating mechanism 5 that allows rotation of said driving lever 52 in said operating direction (e.g. counterclockwise as in the attached figures) and preventing rotation of said driving lever 52 in the opposite direction (i.e. clockwise in the situation of the attached figures).

Figure 10:
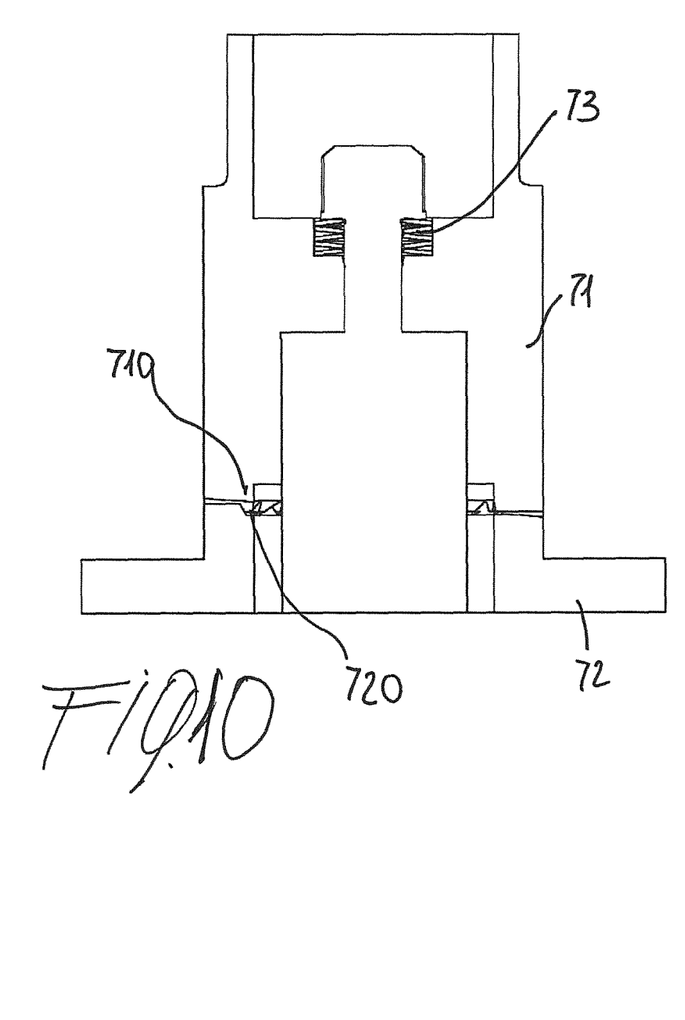
FIG. 10 is a view of a fifth detail of a fast earthing switch device according to the invention.

With reference to FIG. 10, such result can be achieved by using a first 71 and a second 72 mechanical coupling having corresponding contact surfaces 710 and 720 machined so as to allow free rotation between them in one direction and prevent any rotation in the opposite direction. Spring means, e.g. a cup spring 73, ensure the proper contact force between the contact surfaces 710 and 720.

In a particular embodiment of the fast earthing switch device 1 according to the present invention, said coupling means 6 comprises a fork 61, 62 which is operatively coupled to said movable contact 3 and operatively couplable to and uncouplable from said driving lever 52. In such a case, as shown in the attached figures, the driving lever 52 conveniently comprises a roller 521 positioned at its end so as to ensure a smooth coupling and uncoupling with the fork 61, 62.

Figure 8:
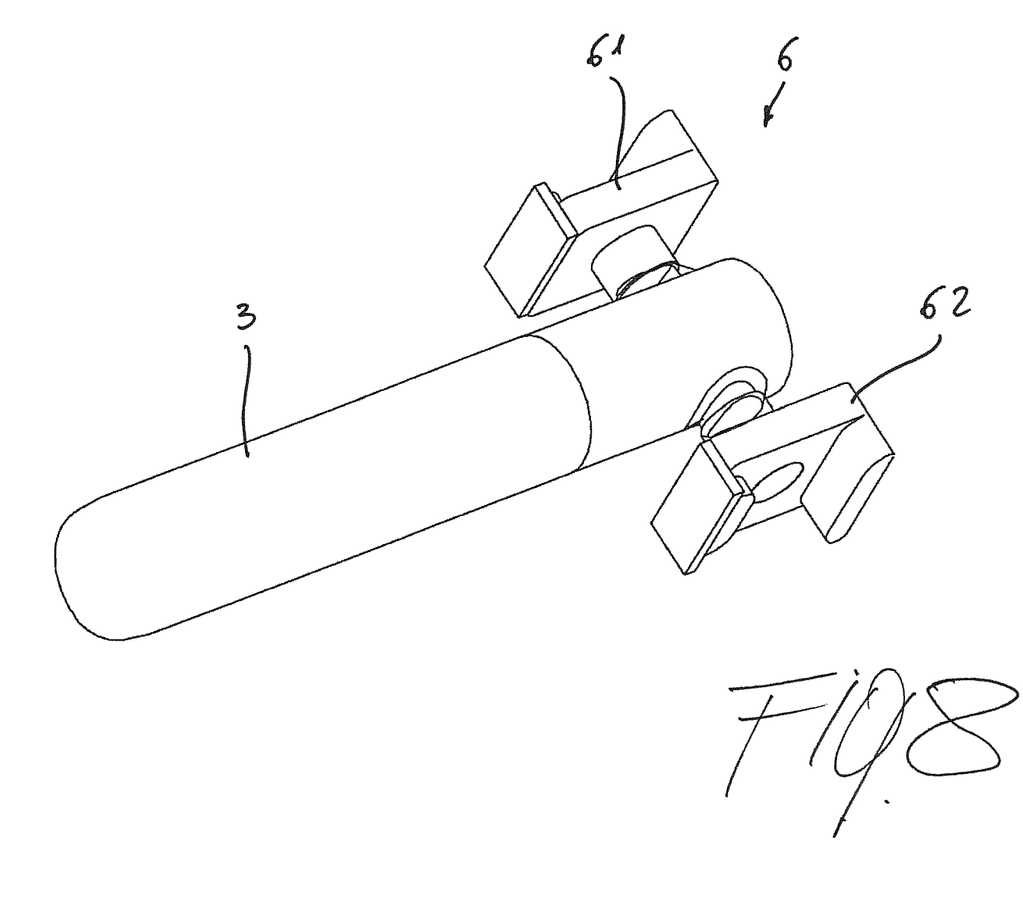
FIG. 8 is a view of a third detail of a fast earthing switch device according to the invention.
Figure 9:
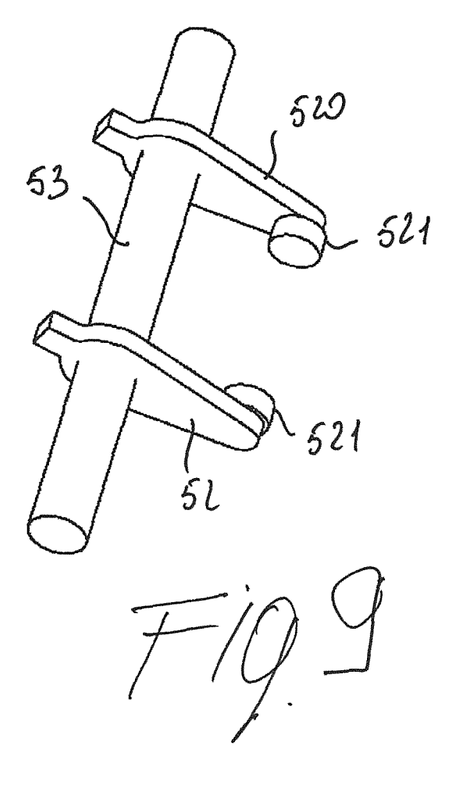
FIG. 9 is a view of a fourth detail of a fast earthing switch device according to the invention.

With reference to FIG. 9, in a highly preferred embodiment of the fast earthing switch device 1 according to the present invention, the operating mechanism 5 comprises a first 52 and a second 520 driving lever which are positioned on opposite sides of said movable contact 3. Correspondingly, as shown in FIG. 8, the coupling means 6 conveniently comprises a first 61 and a second 62 fork which are also positioned on opposite sides of said movable contact 3.

Figure 7:
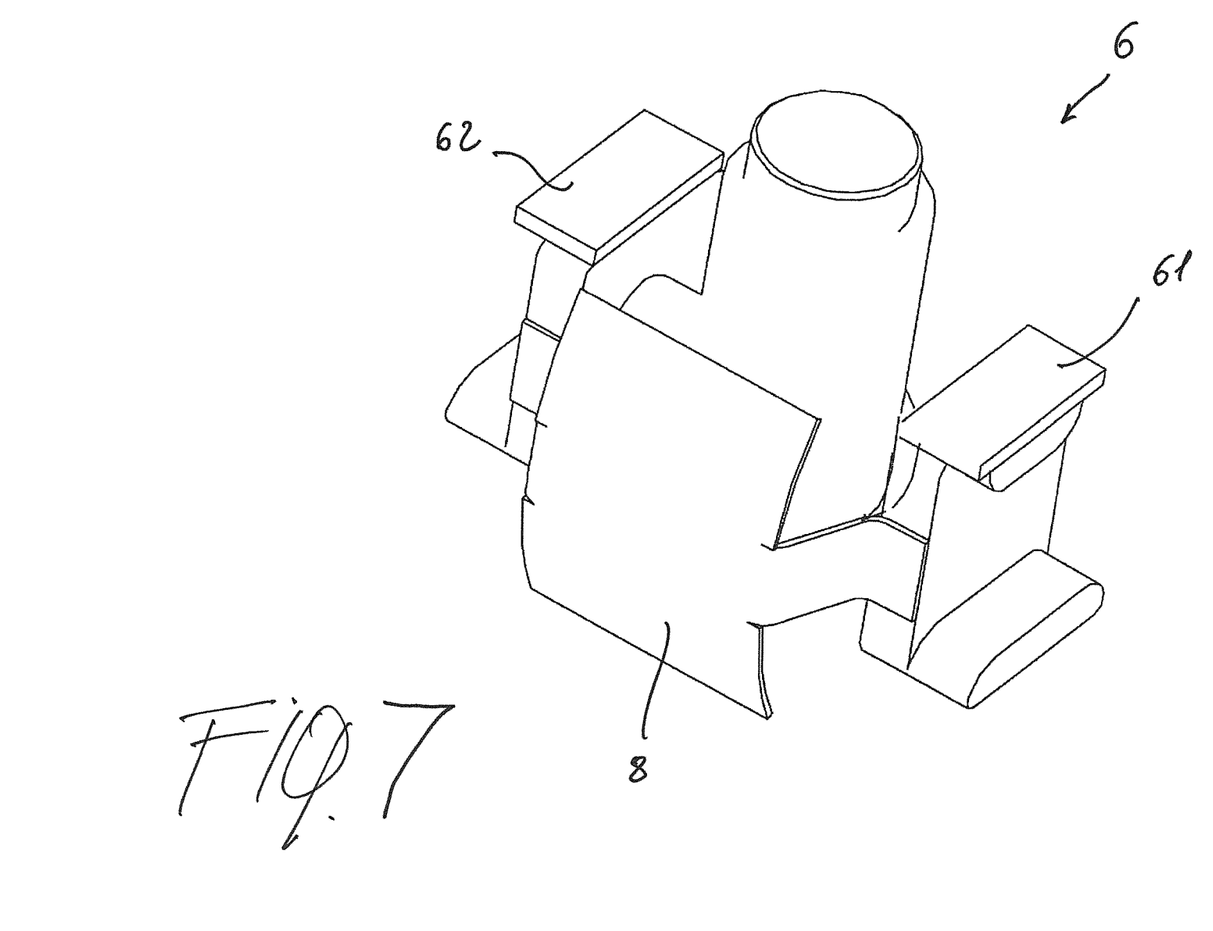
FIG. 7 is a view of a second detail of a fast earthing switch device according to the invention.

With reference to FIG. 7, in a further particular embodiment of the fast earthing switch device 1 according to the present invention, one or more signaling means 8 can be properly positioned on the contact assembly for signaling the open or closed conditions of said device 1, said signaling means 8 being preferably positioned in such way that it/they can be seen through a viewport from the outside.

Figure 11:
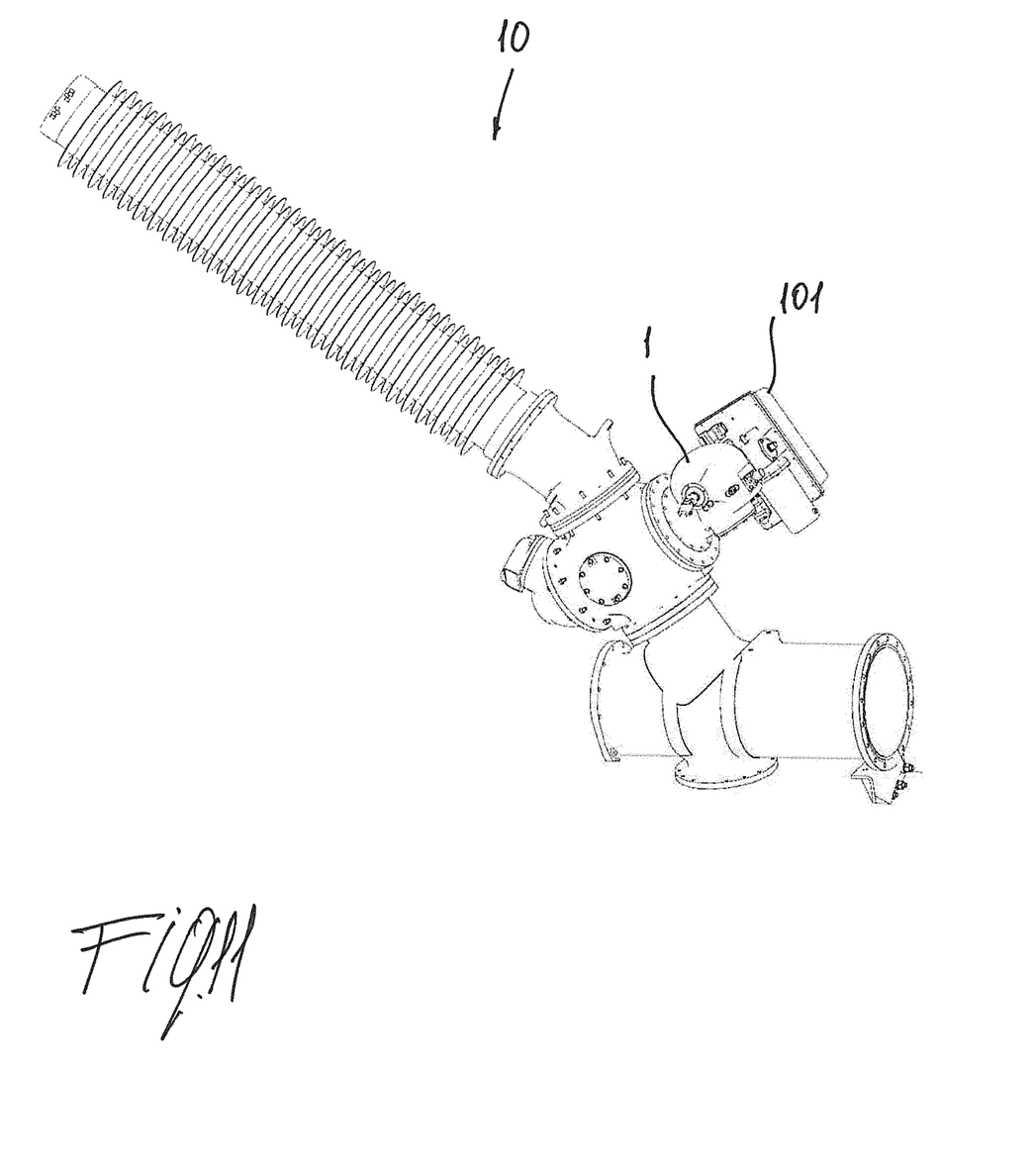
FIG. 11 is a view of a HV pole comprising a fast earthing switch device according to the invention.

With reference to FIG. 11, as previously said, a HV pole 10 comprising a fast earthing switch device 1 as described in the present disclosure is also part of the present invention. Generally, the fast earthing switch device 1 comprise at least a motor 101 operatively connected to the operating shaft for operating the device 1

Figure 12:
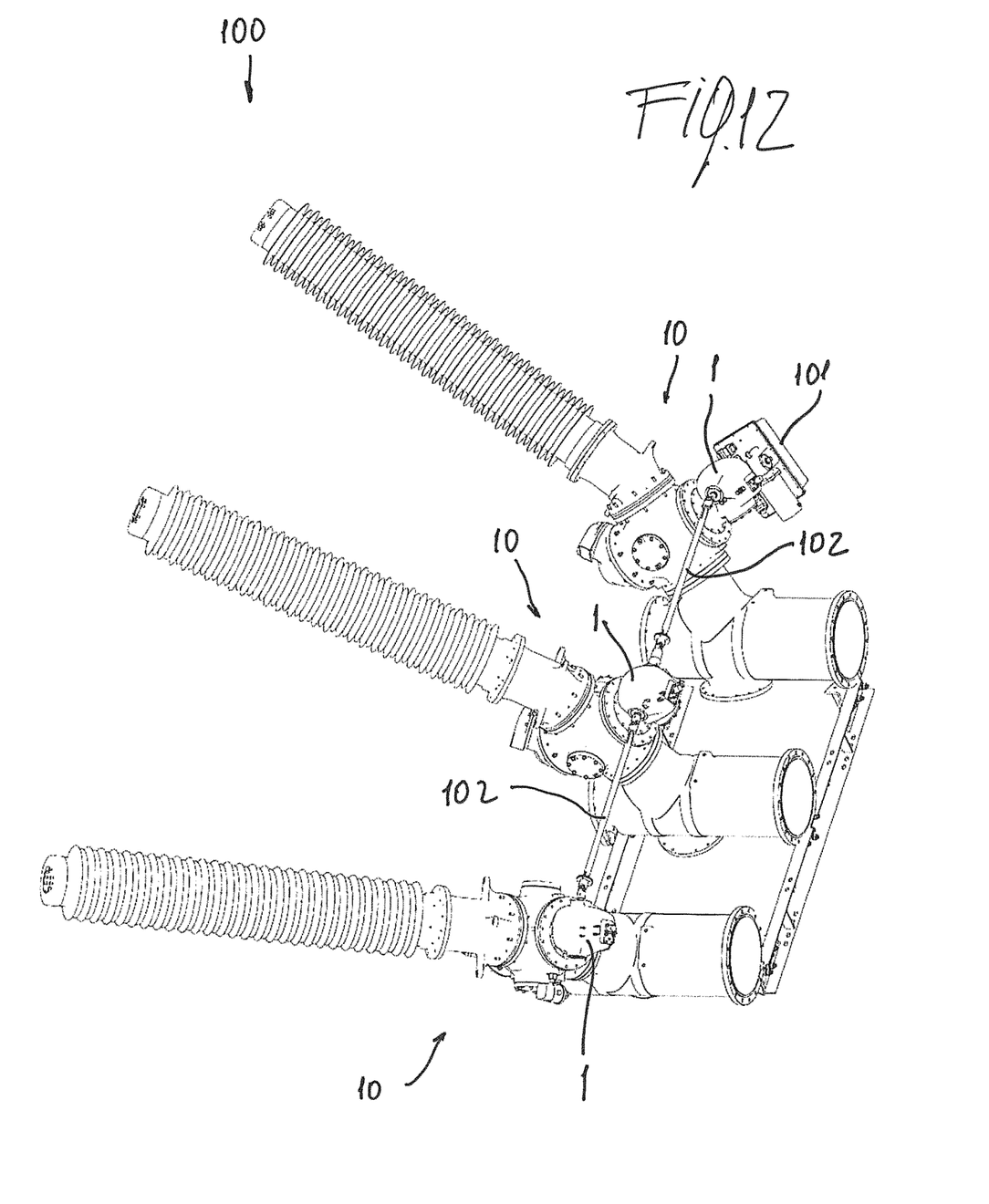
FIG. 12 is a view of a three-pole HV substation comprising three poles comprising a fast earthing switch device according to the invention.

Then, with reference to FIG. 12, in case of a three-pole HV substation 100 comprising for each pole 10 a fast earthing switch device 1 as described in the present disclosure, the devices 1 can be operated by a single motor 101. The motor 101 is mechanically connected to the three devices 1 through the mechanical linking 102 for actuating all fast earthing switch devices 1 (three-pole operated device).

Alternatively, according to a different embodiment not shown, a three-pole HV substation can comprise for each pole a fast earthing switch device as described in the present disclosure and further comprise for each pole a motor for actuating the fast earthing switch device of the corresponding pole (single-pole operated device).

Several variations can be made to the fast earthing switch device thus conceived, all falling within the scope of the attached claims. In practice, the materials used and the contingent dimensions and shapes can be any, according to requirements and to the state of the art.

The invention claimed is:

1. A fast earthing switch device for High Voltage applications comprising:
    a gas-tight casing, a movable contact connectable to and unconnectable from a fixed contact, said movable contact being linearly movable along a direction of movement between an open position in which said movable contact is spaced apart from said fixed contact and a closed position in which said movable contact is connected to said fixed contact, and vice-versa,
    an operating mechanism for said movable contact, said operating mechanism comprises an actuating spring actuating a closing operation of said movable contact from said open position to said closed position, at least a driving lever mounted on an operating shaft actuating an opening operation of said movable contact from said closed position to said open position, said driving lever also partially reloading said actuating spring during said opening operation, and
    coupling means operatively coupling said driving lever to said movable contact,
    wherein said closing operation comprises a first phase in which said driving lever is engaged with said coupling means and moves said movable contact so that said movable contact is further spaced apart from said fixed contact while said actuating spring is further loaded, and a second phase in which said driving lever disengages from said coupling means and the movable contact is free to fast move under an action of said actuating spring into said closed position.

2. The fast earthing switch device according to claim 1, wherein said actuating spring is a compression spring coaxially mounted on said movable contact, and in that said operating shaft is substantially perpendicular to the direction of movement of said movable contact during said opening/closing operations, said driving lever rotating in a plane perpendicular to said operating shaft during said opening/closing operation.

3. The fast earthing switch device according to claim 2, wherein said open position said driving lever is engaged with said coupling means and retains said movable contact in said open position and said actuating spring in a partially loaded condition.

4. The fast earthing switch device claim 2, wherein said opening operation said driving lever engages said coupling means and move the movable contact from said closed position into the open position, partially loading at a same time said actuating spring.

5. The fast earthing switch device according to claim 2, wherein during said opening and closing operations said driving lever rotates always in a same operating direction.

6. The fast earthing switch device according to claim 1, wherein said open position said driving lever is engaged with said coupling means and retains said movable contact in said open position and said actuating spring in a partially loaded condition.

7. The fast earthing switch device claim 6, wherein said opening operation said driving lever engages said coupling means and move the movable contact from said closed position into the open position, partially loading at a same time said actuating spring.

8. The fast earthing switch device according to claim 1, wherein said opening operation said driving lever engages said coupling means and move the movable contact from said closed position into the open position, partially loading at a same time said actuating spring.

9. The fast earthing switch device according to claim 1, wherein during said opening and closing operation said driving lever rotates always in a same operating direction.

10. The fast earthing switch device according to claim 9, wherein said operating mechanism comprises locking means allowing rotation of said driving lever in said operating direction and preventing rotation of said driving lever in an opposite direction.

11. The fast earthing switch device according to claim 1, wherein said coupling means comprises a fork operatively coupled to said movable contact and operatively couplable to and uncouplable from said driving lever.

12. The fast earthing switch device according to claim 1, wherein said operating mechanism comprises a first lever and a second lever positioned on opposite sides of said movable contact.

13. The fast earthing switch device according to claim 1, further comprising signalling means for signalling the open/closed positions of said device.

14. A High Voltage pole comprising a fast earthing switch device according to claim 1.

15. A three-pole High Voltage substation comprising:
   for each pole a fast earthing switch device according to claim 1; and
   at least one of a single motor for actuating said fast earthing switch devices and mechanical connections linking said motor to said fast earthing switch devices or for each pole a motor for actuating the fast earthing switch device of the corresponding pole.

\* \* \* \* \*